US006983278B1

(12) United States Patent
Yu et al.

(10) Patent No.: US 6,983,278 B1
(45) Date of Patent: Jan. 3, 2006

(54) SYSTEM AND METHOD FOR ACCESS CONTROL AND FOR SUPPLY CHAIN MANAGEMENT VIA A SHARED BILL OF MATERIAL

(75) Inventors: Janet Yu, San Francisco, CA (US); Eric Larkin, San Jose, CA (US); Michael Topolovac, Monterey, CA (US)

(73) Assignee: Arena Solutions, Inc., Menlo Park, CA (US)

( * ) Notice: Subject to any disclaimer, the term of this patent is extended or adjusted under 35 U.S.C. 154(b) by 338 days.

(21) Appl. No.: 10/120,898

(22) Filed: Apr. 10, 2002

Related U.S. Application Data

(63) Continuation-in-part of application No. 09/832,753, filed on Apr. 10, 2001.

(60) Provisional application No. 60/283,061, filed on Apr. 10, 2001.

(51) Int. Cl.
*G06F 17/30* (2006.01)

(52) U.S. Cl. .............................. 707/9; 707/10; 709/203

(58) Field of Classification Search .................. 707/10, 707/9, 100, 200, 201; 705/21, 64; 709/217, 709/238, 203
See application file for complete search history.

(56) References Cited

U.S. PATENT DOCUMENTS

| 4,875,162 | A | 10/1989 | Ferriter et al. ............... 364/401 |
|---|---|---|---|
| 5,493,679 | A | 2/1996 | Virgil et al. .................. 395/600 |
| 5,555,408 | A | 9/1996 | Fujisawa et al. ................ 707/5 |
| 5,655,087 | A | 8/1997 | Hino et al. ................... 395/229 |
| 5,740,425 | A | 4/1998 | Povilus ....................... 395/611 |
| 5,826,265 | A | 10/1998 | Van Huben et al. ............. 707/8 |
| 5,918,228 | A * | 6/1999 | Rich et al. ..................... 707/10 |
| 5,937,160 | A * | 8/1999 | Davis et al. ................. 709/203 |
| 6,058,399 | A * | 5/2000 | Morag et al. ................ 707/201 |
| 6,167,406 | A | 12/2000 | Hoskins et al. ............. 707/102 |
| 6,208,995 | B1 * | 3/2001 | Himmel et al. ........... 707/104.1 |
| 6,212,524 | B1 | 4/2001 | Weissman et al. .......... 707/101 |
| 6,256,596 | B1 | 7/2001 | Leite, Jr. et al. ................ 703/2 |
| 6,311,207 | B1 * | 10/2001 | Mighdoll et al. ............ 709/203 |
| 6,339,767 | B1 | 1/2002 | Rivette et al. .................. 707/2 |

(Continued)

OTHER PUBLICATIONS

Shin et al., Secure and Efficient Schemes to Entrust the Use of Private Keys, Enabling Technologies: Infrastructure for Collaborative Enterprises, 1999. (WET ICE '99) Proceddings. IEEE Workshops on Jun. 16-18, 1999 Pages(s): 174-177.*

(Continued)

*Primary Examiner*—Greta Robinson
(74) *Attorney, Agent, or Firm*—Dov Rosenfeld; Inventek

(57) ABSTRACT

A method and computer program product for securely uploading and downloading data from a client to a remote data storage location under control of a remote application program. The data is stored in encrypted form so that the data server has no access to the data. The data is associated with a bill of material (BOM) and may be accessed by users without providing access to the data space of the client. Also disclosed is a method and computer program so automatically assign access privileges to one or more users of data in a bill of material stored in a shared database such that the step of refining a role for the user for a data item automatically assigns access privileges for the user for the data and other related data items. Also described is linking BOMs to provide peer-to-peer access and views to different users. Also described is a method and software program that provides of propagation of data through the supply chain via one or more bills of materials.

31 Claims, 12 Drawing Sheets

U.S. PATENT DOCUMENTS

| | | | |
|---|---|---|---|
| 6,505,205 B1 | 1/2003 | Kothuri et al. | 707/100 |
| 6,622,149 B1 | 9/2003 | Kellstrom, Jr. | 707/104.1 |
| 6,651,072 B1 * | 11/2003 | Carino et al. | 707/10 |
| 6,741,980 B1 * | 5/2004 | Langseth et al. | 707/2 |
| 2001/0056436 A1 | 12/2001 | Stejskal et al. | 707/200 |
| 2002/0007293 A1 | 1/2002 | Clemens et al. | 705/7 |
| 2002/0007348 A1 | 1/2002 | Ali et al. | 705/51 |
| 2002/0023109 A1 | 2/2002 | Lederer, Jr. et al. | 707/511 |
| 2003/0200290 A1 * | 10/2003 | Zimmerman et al. | |

OTHER PUBLICATIONS

Brochure: Agile Hosting Services, Agile Software Corp., Jun. 28, 2002. Available at www.agilesoft.com, p. 1-3.

Agile Software, Bill Nee, "Agile Support for XML Standards", Whitepaper, Agile Software Corp., California, Nov. 2001. Available at www.agilesoft.com, p. 1-19.

Trilogy Design, Grass Valley, California. "Personal Parts List Manager & Vendor Database for Windows 95/98/NT". Available at www.info@trilogydesign.com, p. 1-3.

Trilogy Design, Grass Valley, California. "Designing or Building Something?". Available at www.trilogydesign.com, p. 1-2.

Brochure: Product Collaboration in the Medical Device Industry, Agile Software Corp. California, Available at http://www.agilesoft.com/wp/index.asp, p. 1-5.

Brochure: Collaborative Manufacturing in the Semiconductor Industry, Agile Software Corp. California, Available at http://www.agilesoft.com/wp/index.asp, p. 1-11.

Trilogy Design, Grass Valley, California. "Parts & Vendors: EX Edition—Extended features". Available at www.trilogydesign.com/ex_edition.htm, p. 1-2.

Trilogy Design, Grass Valley, California. "Parts & Vendors: Data Security". Available at www.trilogydesign.com/data_security.htm, p. 1-2.

Trilogy Design, Grass Valley, California. "Parts & Vendors: Edition Featured Matrix". Available at www.trilogydesign.com/edition_matrix.htm.

"Program Review of Eigner+Partner's axalant cPDm Program", CIMdata, Inc., Sep. 2000. Available at http://www.CIMdata.com, p. 1-31.

* cited by examiner bc_users

| userID | account_ID | current_workspace | ... |
|---|---|---|---|
|  |  |  | ... |
|  | ⋮ |  | ... |

FIG. 4A bc_accounts

| account_ID |  |  |
|---|---|---|
|  |  | ... |
|  |  | ... |
|  | ⋮ |  |

FIG. 4B

FIG. 5A bc_item

| item_ID | supplier_shared_p | customer_shared_p | owner | ... |
|---|---|---|---|---|
| | ⋮ | | | ... |

FIG. 5B bc_entity

| entity_ID | can_own_p | contact_ID | account_ID | owner | ... |
|---|---|---|---|---|---|
| | ⋮ | | | | ... |

FIG. 5C bc_item_source_map

| item_ID | entity_ID | supplier_item_ID | owner | sell_item_p | ... |
|---|---|---|---|---|---|
| | ⋮ | | | | ... |

FIG. 5D bc_item_assy_map

| parent_ID | child_ID | owner | ... |
|---|---|---|---|
| | ⋮ | | ... |

FIG. 5E bc_access

| user_ID | owner | access_type | access_context | ... |
|---|---|---|---|---|
| | ⋮ | | | ... |

FIG. 5F bc_roles

| access_type | priv_1_p | priv_2_p | ... |
|---|---|---|---|
| | ⋮ | | ... |

FIG. 5G bc_supplier_item

| supplier_item_ID | supplier_ID | | ... |
|---|---|---|---|
| | ⋮ | | ... |

SYSTEM AND METHOD FOR ACCESS CONTROL AND FOR SUPPLY CHAIN MANAGEMENT VIA A SHARED BILL OF MATERIAL

The present invention is a continuation-in-part of U.S. application Ser. No. 09/832,753 titled "SYSTEM AND METHOD FOR MANAGING DATA IN MULTIPLE BILLS OF MATERIAL OVER A NETWORK" filed Apr. 10, 2001, to inventors Eric Larkin, Michael Topolovac, and Janet Yu. U.S. application Ser. No. 09/832,753 is hereby incorporated herein by reference.

The present invention claims benefit of U.S. Provisional Patent application Ser. No. 60/283,061, titled "ACCESS CONTROL SYSTEM FOR SUPPLY CHAIN MANAGEMENT," filed Apr. 10, 2001 to inventors Topolovac, et al. Provisional Patent application Ser. No. 60/283,061 is hereby incorporated herein by reference.

The present invention is related to U.S. Provisional patent application Ser. No. 60/195,918 titled "SYSTEM AND METHOD FOR HOSTING MULTIPLE BILLS OF MATERIAL FOR MULTIPLE COMPANIES IN A SINGLE NAMESPACE" filed Apr. 10, 2000 by Eric Larkin and Michael Topolovac; U.S. Provisional patent application Ser. No. 60/206,219 titled "SYSTEM AND METHOD FOR TRANSPARENT ELECTRONIC PROCESSING" filed May 22, 2000 by Eric Larkin and Michael Topolovac; U.S. Provisional patent application Ser. No. 60/206,221 titled "SYSTEM AND METHOD FOR VENDOR PERFORMANCE TRACKING" filed May 22, 2000 by Eric Larkin and Michael Topolovac; U.S. Provisional patent application Ser. No. 60/210,935 titled "SYSTEMS AND METHODS FOR UTILIZING MULTIPLE BILLS OF MATERIAL FROM MULTIPLE COMPANIES STORED INA SINGLE NAMESPACE" filed Jun. 12, 2000, by Eric Larkin, Michael Topolovac, and Janet Yu; U.S. Provisional Patent application Ser. No. 60/283,077 titled "COMPUTER AIDED DESIGN AND BILL OF MATERIALS INTERFACE," filed Apr. 10, 2001; and concurrently filed U.S. patent application Ser. No. 10/120,897 filed Apr. 10, 2002, titled "METHOD, APPARATUS, AND PRODUCT TO ASSOCIATE COMPUTER AIDED DESIGN DATA AND BILL OF MATERIALS DATA," filed Apr. 10, 2002 to inventors Cesarotti, et al., assigned to the assignee of the present invention. Each of these patent applications is hereby incorporated herein by reference.

BACKGOUND

This invention relates to a system that facilitates the management of part lists. More particularly the invention relates to secure synchronization, data access, and data sharing aspects of maintaining a central database of bills of material (BOMs) shared between several owners and accessible to different types of users.

The above-reference incorporated by reference parent patent application Ser. No. 09/832,753 describes how a user can view and manipulate a BOM stored in a remote database by directly communication with a remote application server running an application program that accesses a database containing BOM data. The BOM data of several companies may be shared in the same database. Furthermore users having different roles may access a BOM. Some of those users may be third parties, e.g., suppliers or contract manufacturers.

It often is desired to use the BOM as an index or organizational tool to provide access to a wide variety of data about an item, for example sourcing information about vendors from whom the item may be purchased or the CAD data of that item. For some data about an item, e.g., sourcing data, it may be practical to store this data directly in the BOM database. The term "related data" will be used herein to describe such data which relates to an item and which is stored directly in a BOM database. Other data about an item, e.g., CAD data, may be unsuitable for storage in the BOM database. The term "additional data" will be used herein to describe such data that relates to an item but which is not stored directly in the BOM database.

While access to the additional data could be provided by providing users of the BOM data access to the file space where the additional data resides, it may be desirable to make available views of at least some of this additional data to an external user such as a supplier. Because of concerns about security and ease of administration, it is often undesirable to make data in this file space available to external users. As an alternate to providing access to the file space, the access to additional data may be provided, for example, by uploading additional data from a remote user application for association with the BOM data, and then providing access to the uploaded data. The data may be uploaded to the same location where the BOM resides or to a separate data server. It is desired to store such additional data in encrypted form so that other users of the data server, including the administrators of the data server, have no meaningful access to the data. It is further desired to make a view of at least some of the related data and additional data available to third parties such as vendors.

In addition, it is desired that access to all data about an item be controlled by the application that accesses the BOM database, so that information about which users have access to which data about an item is more easily managed. This access information is generally complex, and for an individual user may include which types of data that user may view, edit, create or delete as well as a set of individual items to which the user has access. In the general case, it is desired to be able to grant each user different levels of access to different items.

In some applications, communication between the users of the BOM and the BOM system uses a Web browser at the user, so that data transmitted between the location where the BOM is stored and the remote user location is encoded in a textual format such as html or XML. The additional data may be in binary form, and may include much larger quantities of data than is typically included in a Web page. Thus it may be desired that such communication occur outside this primary communications (html/XML) channel.

One aspect of having a central location wherein several BOMs are stored is that several different users may access the same BOM. It is desired, however, that some users, e.g., suppliers and contract manufacturers, have a limited view of the BOM and of the data about the items in the BOM. One technique for doing this is to assign access privileges to each user, and also assign privileges to the different data in a BOM so that, for example, a supplier cannot see aspects of the BOM that do not relate to components which they supply.

Such setting up of access privileges for each user and to the data stored in a BOM can be tedious, and in many instances impractical, e.g., where access to thousands of items must be administered across tens or hundreds of users. It is desired to have access privileges and views set up automatically based on data captured as part of the BOM data and related data, so that a particular user automatically has the appropriate type of access to a data item depending on that users relationship to that data item. For example, it is desirable to automatically provide access to a vendor to the BOM items that the vendor supplies, but not necessarily to quotes that a different vendor may have supplied for the same item, or to items that cannot be supplied by that vendor.

It further would be advantageous to provide peer-to-peer linking and sharing of data within a system that contains BOMs from several companies. For example, a BOM item of one company may be linked to a BOM item of another company, thereby indicating a bought/sold relationship between the items. Alternately, a BOM of one company may include directly a shared BOM item whose data is owned and maintained by another company, for example, when a company uses a contract manufacturer and approves one of the contract manufacturer's BOM items for use in their product. Shared BOM items are also desired when a company contracts with a different company to maintain BOM data for commodity items. In these situations, it is desirable for the system to automatically generate for each user of the views appropriate to the role the user has to the data. For example, it would be advantageous for a user who is represents a manufacturer and maintains a BOM for an item of manufacture to see an "owner" view while a supplier who supplies an item in the BOM to see a "supplier" view.

With peer-to-peer linking and sharing of BOM data across one or more users representing one or more companies, it is desirable to have information cascade through the supply chain for an item. In this manner, when a supplier changes a price of a component of the item, for example by accessing the BOM in a supplier view of BOM, the view of the BOM presented to a contract manufacturer would then be automatically updated. It would be further desired that this update to the contract manufacturer's BOM automatically update contract manufacturer's cost and also the offered price of the manufactured subassembly. This change in price for the manufactured subassembly would automatically pass to the view the creator of an item that uses the subassembly sees. It is thus desirable to provide for propagating changes through more than one transaction layer of the supply chain all the way to the cost of a finished manufactured item as provided in a catalog. It is of course desirable that additional information besides cost propagate in this fashion. For example, when a supplier changes one or more of the technical characteristics of an item, it is desirable for the displayed technical characteristics of that item to propagate to other companies that make use of that item. It is also desirable that information about BOM items automatically propagate down the supply chain (from customer to supplier) as well as up the supply chain (from supplier to customer). For example, certain items are made to customer specification by suppliers, and it is desirable for the supplier's view of the item to be automatically updated when the customer requirements for the item are changed.

SUMMARY

One aspect of the invention enables management and communications along a supply chain. A method is disclosed for a first user to upload data to a remote storage server so that the data may be accessed by another user without providing access to the first user data space and without providing access or control of the upload to the remote storage server, A method also is described for automatically assigning access privileges while defining a bill of materials and the role a party has to that data. Furthermore, relationships between bills of material (BOMs) are described such that data may freely propagate through the supply chain.

One method described is for securely uploading data via a network from a local file system to storage in a data server. This includes selecting the data for upload, requesting the upload from an application program, receiving from the application program a redirect to the data server, sending the data selected for upload to the data server according to the redirect, at the data server, receiving a ticket issued and authorized by the application program; and at the data server, storing the data in encrypted form. A method for securely downloading data also is described.

DESCRIPTION OF THE DRAWINGS

FIGS. 4A and 4B illustrate the tables maintained by the BOM application on users and accounts according to one relational database embodiment of the system.

FIGS. 5A–5G illustrate the tables maintained by the BOM application for data in a workspace according to one relational database embodiment of the system.

DETAILED DESCRIPTION

Figure 1:
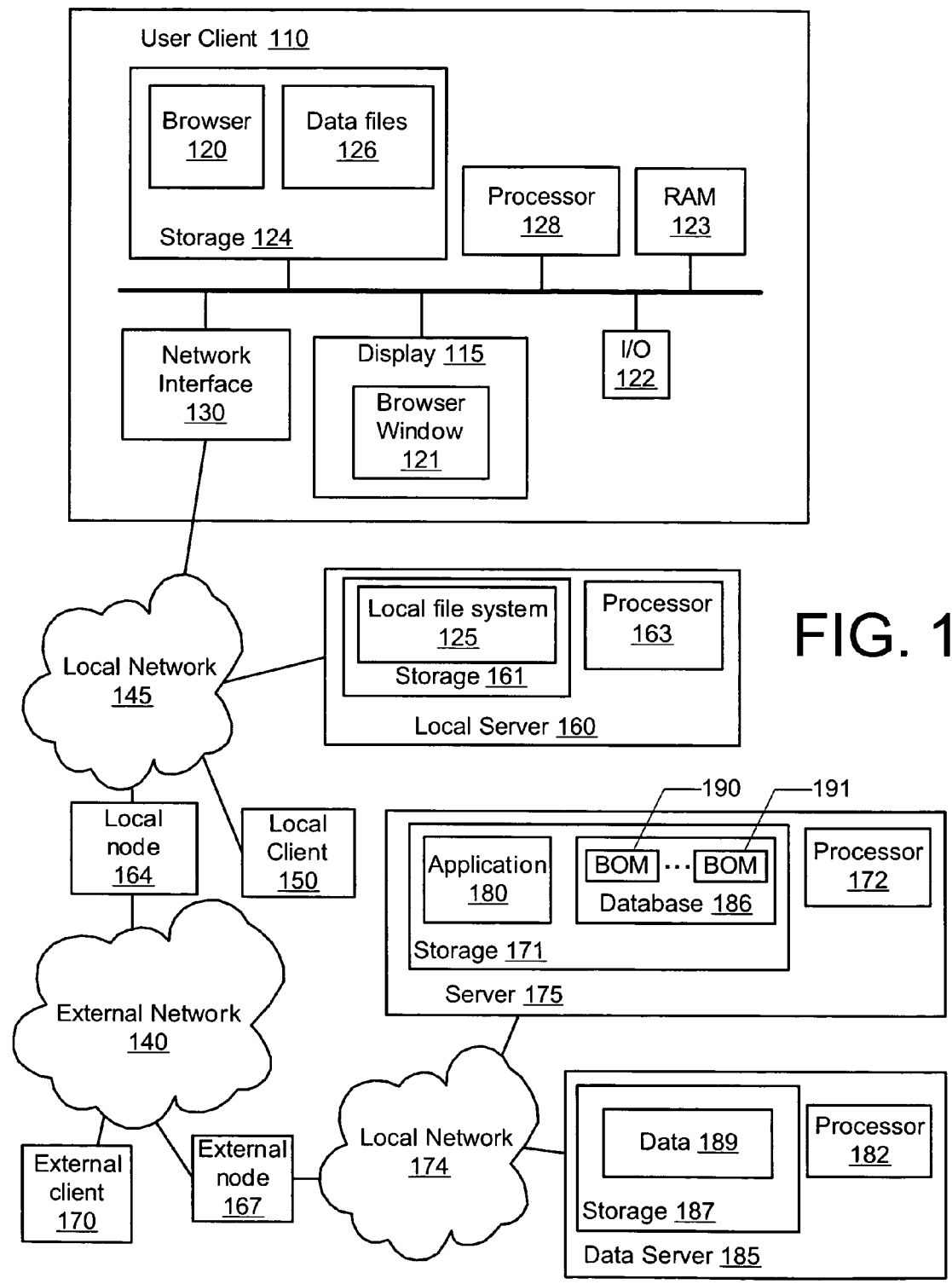
FIG. 1 illustrates elements of an environment in which one embodiment of the invention.

FIG. 1 illustrates elements of one embodiment of the invention. User client 110 is a computer with a display 115, storage 124 that includes one or more storage devices, a processor 128, RAM 123, and one or more input/output interfaces 122 that connect to such devices as a mouse, a keyboard, and other input/output devices. The storage stores a browser program 120 that when run on the client provides for viewing and interacting with data presented in XML or HTML or some other language or format on the display 115 as a browser window 121. User client 110 also includes a network communication interface 130 that enables data transfer between client 110 and an external network 140. In one embodiment, the external network is the Internet, and in another embodiment, a private network. Typically, the user client 110 is part of a local network 145 so that communication to the external network is via the local network and a local node 164 of the local network. The local network 145 may be further connected to a local client 150 and a local server 160. The local server includes storage that stores a local file system 125. Some information about an item may be stored in the local file system 125.

While the system shown in FIG. 1 has storage the local file system all in the storage 124 of the user client 110, it is to be understood that in different configurations, all or parts of the local file system may be located outside the local client 110, e.g., in the local client 150 or in the local server 160.

An external server 175 is also able to communicate to the external network 140, for example via a second local network 174 through an external node of the second local network. An external client 170 may also be coupled to the external network. The server 175 includes one or more processors 172 and storage 171 that includes one or more storage devices. Storage 171 contains an application program 180 that provides access to a database 186 that includes one or more bills of materials (BOMs). The application 180 is called the BOM application herein, and the server 175 is called the BOM application server or simply the BOM server herein. In one embodiment, the database 186 is in the storage 171 of the BOM application server 175, while in an alternate embodiment, the database 186 resides in a data server 185, and access to that data server is via a network. The network coupling between the BOM application server 175 and the data server 185 may be via the external network 140, or, as shown in FIG. 1, via the second local network. The data server includes a processor 182 and storage 187 that includes one or more storage devices in which database 186 is stored.

In one embodiment, communication between the BOM application 180 and a user on client 110 is via the browser 120 and is secure, for example using the hypertext transfer protocol with encryption via the secure sockets layer (SSL) protocol. The BOM application acts as a Web server to the browser 120.

The BOM of an item is a hierarchical structure that describes the components and processes and in some cases reference information about that item such as related documents. A BOM is representable as a tree structure, with each node of the tree representing an item or process or reference item that is an element of the root item. A BOM is representable as a tree with any node of the tree representing an item. Associated with each node may be several pieces of information such as part number, description, potential suppliers, price, owner of the BOM data, and so forth. In one embodiment, the BOM is stored as part of a relational database system containing a collection of tables that represent the owners, the items belonging to the owner, and users of the system. Each item in a BOM is uniquely identified in the in database 176. In one embodiment, the unique identification uses a unique identifier.

As described in above referenced and incorporated herein by reference U.S. patent application Ser. No. 09/832,753 to Larkin, et al., a user can view and manipulate a BOM such as BOM 190 stored in database 186 at the client 110 using the browser 120. The database 186 contains a plurality of BOMs that may have different owners. A single BOM may be accessible to different users that may not all have the same role and some of whom may be affiliated with or employed by organizations that are not the owner of the BOM.

It is desired to associate data with a BOM or an item in a BOM. Such data may be specification of the item that a user may with to share with other interested parties, the computer aided design (CAD) data of an item, or any other information. An example of one such a use is described in related concurrently files patent application Ser. No. 10/120, 897 titled "METHOD, APPARATUS, AND PRODUCT TO ASSOCIATE COMPUTER AIDED DESIGN DATA WITH AND BILL OF MATERIALS DATA," incorporated herein by reference and assigned to the assignee of the present invention, where it is described how to associate the CAD data with an item in a BOM so that, for example, such CAD data is available to other users of the BOM, and so that the CAD data may be synchronized with other users of the CAD data.

Some of the associated data may be in a form desirably securely stored in an encrypted form, for example in a data server such as server 185. The information to be securely stored is referred to herein as "additional information." The additional information, for example, may be in binary form.

One aspect of the invention provides for transferring such additional, e.g., additional binary information to be transferred and linked with the BOM data, either by storing the additional information with the BOM data or, in one embodiment, as associated data 179 in the storage 187 of the data server 185. Furthermore, some of the additional information may initially be stored as part of the local file system 125 on local server 160. The storing of such additional data, e.g., from local server 160 as separate data in the data server may occur by secure uploading process described below. Such secure uploading is used for example to ensure that the data in data server 185 is stored in encrypted form and that once the data is stored, the data server can only access, i.e., decrypt the data by having authority from the BOM application 180. For such an upload, the user at client 110 requests the upload from the BOM server. Furthermore, once the user has authenticated himself or herself to the BOM application 180, the upload may proceed without the user needing to further authenticate himself or herself to the data server 185.

Figure 2:
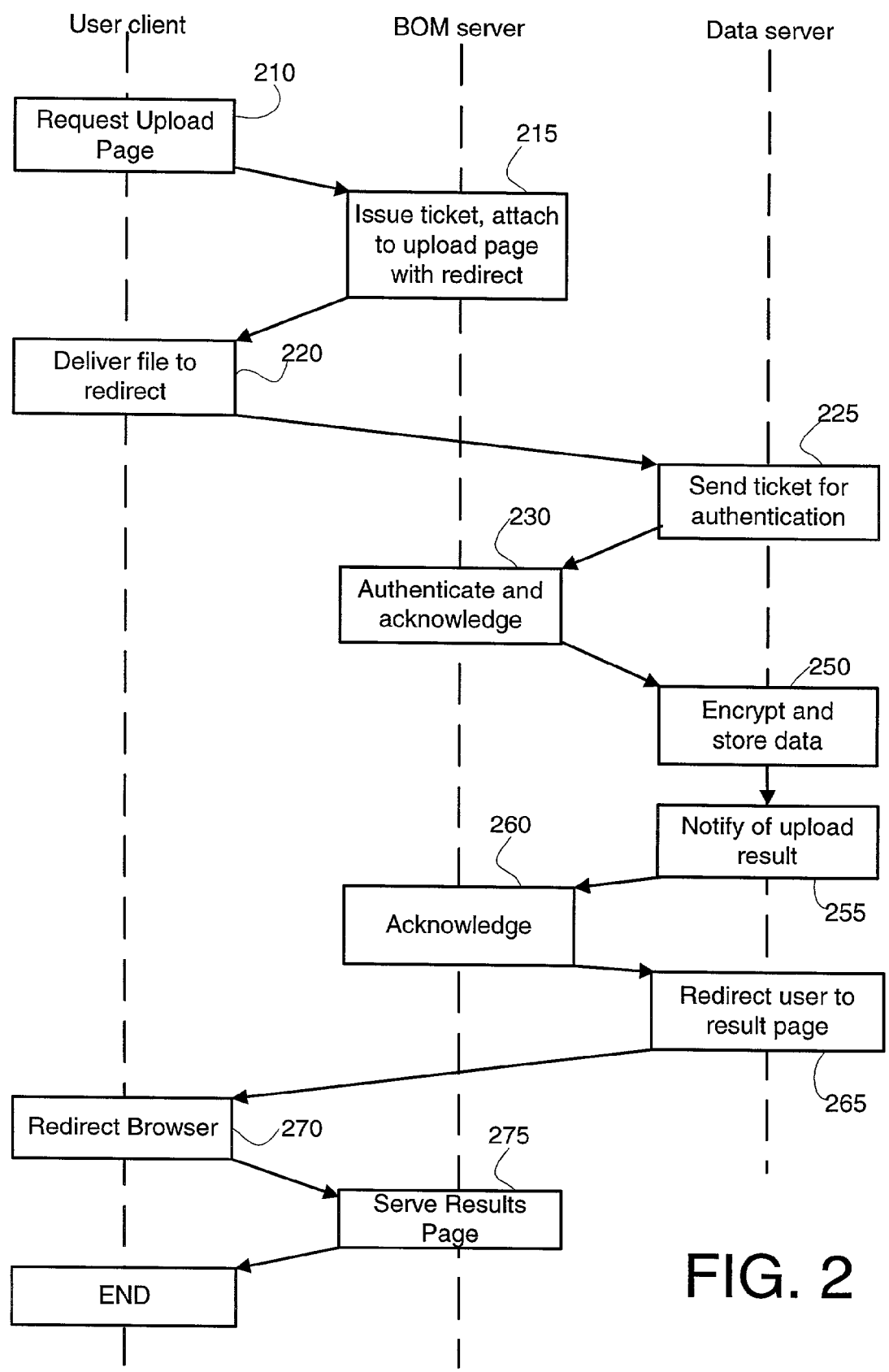
FIG. 2 illustrates in simplified flowchart form the steps involved in securely uploading data to the data server of FIG. 1 according to one embodiment of the invention.

FIG. 2 illustrates the steps involved in an embodiment for securely uploading data from the local file system 125 to the data server 185 under the control of the BOM application 180. For such an upload, in a step 210, the user at client 110 using the browser 120 requests the upload from the BOM application 180 on the BOM server 175. In order to so connect to the BOM application, the user may be required to provide authenticating information such as a password, information from a "smart card," biometric data, and so forth. In one embodiment, the upload is specified on a form that provides for user to enter one or more of such authenticating information, which BOM data the data for upload is attached to, what data to upload from the local file system 125, what version of the data to upload, and so forth. Upon receiving the request, the BOM application 180 in step 215 issues a transaction ticket for the upload and provides to the user a Web page (called an "upload page") that includes the ticket and a redirect to data server 185. The upload page in one embodiment is in the form of a user interface at step 220 that provides for the user to modify or specify what BOM data the uploaded data is associated with, the location of the data for upload on the local file system 125, and so forth. In another embodiment, the information for the upload is the information collected in step 210 and no further user interaction is needed. Using the redirect, the specified information is uploaded with the ticket to the data server 185 for storage. As a security measure, the data server 185 does not complete the upload without a transaction ticket and without authenticating the ticket with the BOM application 180. The data server receives the ticket and forwards it to the BOM application 180 on the BOM server 175 for authentication and authority to proceed. The BOM application 180 authenticates the ticket and, if authentication is successful, sends the data server an acknowledgment that that data server is now authorized to proceed. In one embodiment, the ticket includes only identifying information for the transfer, and an encryption key that the data server 185 is to use to encrypt the data prior to storage and a specified location in storage 187 are included in the acknowledgement sent by BOM application 180. In another embodiment, the ticket includes the encryption key and the specified location in storage 187. In one embodiment, the encryption key is a one way key such that a different key matched to this encryption is needed to decrypt the data. In another embodiment, the data server 185 discards the encryption key after use. In one embodiment, the actual transfer of data to data server 185 occurs simultaneously with the transfer of the ticket. In another embodiment, the ticket is transmitted and authenticated before the actual data transfer is completed. If the ticket is is successfully authenticated, the data server 185 in a step 250 encrypts and stores the data as associated data 189 in the storage system 187. If the ticket is rejected by BOM application 180, the data server discards any uploaded data.

In a step 255 the data server 185 notifies the BOM application 180 of the results of the upload. In one embodiment, the notification includes information regarding any specific fields or data records of a BOM that are to be updated as a consequence of the upload. In such an embodiment, step 255 includes sending such data to the BOM application so that it may update the BOM data in database 186. For example, the notification may include the name or size of an uploaded file if that data was not sent when the transaction ticket was authenticated. In a step 260, the BOM application 180 acknowledges the notification to the data server 185 and provides sufficient information to the data server 185 to enable the data server 185 to determine the location of a result page. In step 265, the data server sends a redirect to the user client 110, e.g., the browser 120 to the location of the result page at the BOM application. The user client 1 10 receives the redirect. The browser 120 is redirected (step 270) to the BOM application and the BOM application in a step 275 serves the results page to the user client.

The process illustrated in FIG. 2 works within the constraint that the client communicates with only a single external party at a time. The delivery of the redirects in steps 215 and 265 serve to switch the communication between the BOM application 180 and the BOM data server 185 and vice versa.

One aspect of the process illustrated by FIG. 2 is that the local file system 125 may be located on client 110, local client 150, or local server 160. If the local file system 125 is not located directly on client 110, then client 110 sends an order for the file transfer to the local file system 125 as part of step 220. Note that this communication preferably takes place securely over local network 145.

After the process of FIG. 2 is initiated by client 110 in step 210, part or all of the exchange may be automated with no further input from the user. There may be a significant time delay between steps 220 and 225. In one embodiment, steps 215 through 230 involve one or more transaction tickets that enable multiple file submissions via step 220. Thus, a request made through step 210 enables numerous repetitions of step 220 over an extended period.

Alternate embodiments may operate slightly differently. In a first alternate embodiment, upon receiving the request for upload, the BOM application at server 175 provides a ticket for the upload directly to the data server and a redirect to the client 110. The redirect is then used to carry out the upload. The data server may now authenticate the ticket by comparing the ticket of the upload with the one or more tickets received directly from the BOM application. If a match occurs, the storing proceeds. No further authentication is needed from the BOM application 180.

In yet another embodiment, the encrypting is carried out at the user client 110. In such an embodiment, the redirect page served to the user client includes the encryption key. The ticket that is sent to the data server, in one embodiment via the client user, and in another embodiment, via the user client does not include the encryption key so that the data server is never provided with encryption keys.

In yet another embodiment, data server 185 is configured in advance to know which result pages are available on BOM server 175. In this embodiment, notification of upload result is encoded in the redirect to the result page that is sent at step 265. This embodiment combines step 255 and step 265 into a single step and omits step 260.

Figure 3:
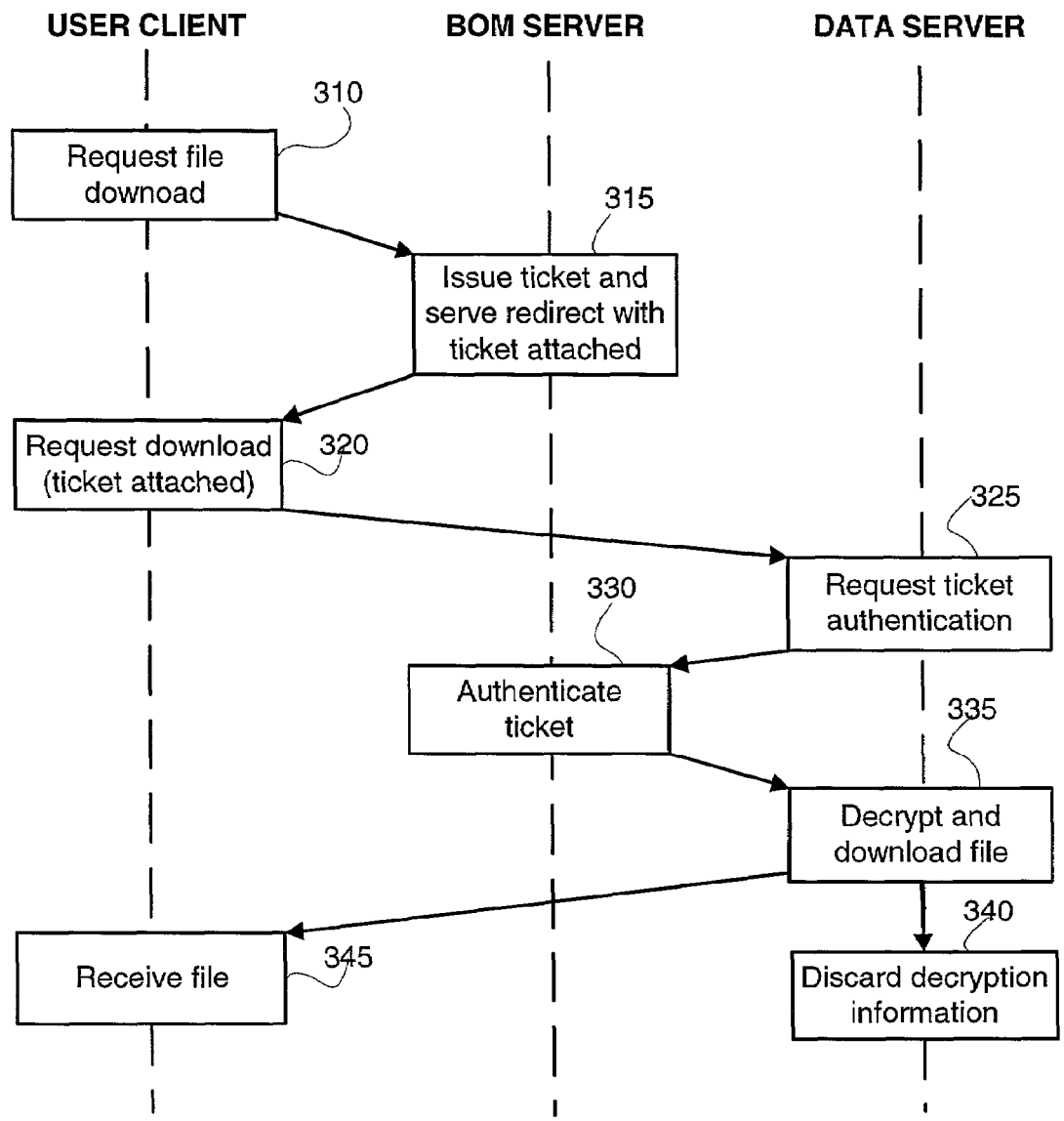
FIG. 3 illustrates in simplified flowchart form the steps involved in downloading data from the data server of FIG. 1 according to one embodiment of the invention.

FIG. 3 is a flowchart of an embodiment of a method for securely downloading to the client 110 data that is securely stored in a server data server such as server 185 outside the local network of the client. "Securely" downloading includes the property that the download is controlled by the BOM application 180, and not by the data server. The method can be used, for example to download data that was previously uploaded using the method described by the flowchart of FIG. 2. The data for download is stored in encrypted form in the data server 185. A feature of the embodiment of FIG. 3 is data securely stored data in storage 187 of data server 185 can be downloaded in a manner such that once the user has authenticated himself or herself to the BOM application 180, the download may proceed without the user needing to further authenticate himself or herself to the data server. As an example, the additional data may be the latest CAD data of an item in a BOM, and the downloading may be updating the CAD data at a remote client. The download need not be to the same location or to the same user of the upload. An another example, the download may be of data to a contract manufacturer who has access to the BOM data relevant to a manufacturing project, while the upload may have been from the designer.

For the download, in step 310 the user at client 110 requests the download from the BOM application 180. In step 315, the BOM application 180 issues a transaction ticket for the download and provides the user at the client 110 a redirect to the data server 185. Using the redirect, in step 320 the user client requests the data for download from the data server. Upon receiving the request with the ticket, the data server in step 325 sends the ticket to the application 180 at BOM server for authentication and authority to proceed. The application 180 in step 330 authenticates the ticket and sends the data server 185 an acknowledgment that that data server is now authorized to proceed. In one embodiment, the decryption key and associated information about the data to be downloaded (such as the location of the requested data in storage 187) is contained in the transaction ticket supplied to the user client at step 315. In another embodiment, the decryption key and associated information about the data to be downloaded is contained in the acknowledgement sent by the BOM server to data server 185 in step 330. The data server in step 335 retrieves the requested data from its storage system 187, decrypts the data and downloads the data to the user client. The data server may now discard the decryption key (step 340). In one embodiment, the decryption key provided in the ticket issued by the BOM server is designed to have a short validity time, i.e., to expire soon after issue to ensure that the data server cannot re-use the key. In another embodiment, the decryption key is a "use-once" decryption key. In step 345, the downloaded data is received at the user client.

In variation, upon receiving the request for download, the BOM application 180 at server 175 provides a ticket for the download to the data server and a redirect to the client 110. The redirect is then used to request the download from the data server. The download request is compared to the ticket and if matched, proceeds as above.

In another variation, the decrypting is carried out at the user client so that the data server never has access to decryption keys. In such an embodiment, the redirect page served to the user client by BOM application 180 includes the decryption key. The ticket that is sent to the data server, in step 320 then does not include the decryption key, and step 340 may be omitted.

The methods illustrated in FIGS. 2 and 3 enable mirrored copies of data to be established on the local file system 125 and network based file system 185. Application programs at both user client 110 and the external BOM application server 175 can access the data over secure high capacity networks and neither party need rely on frequent transfers over external network 140 such as the World Wide Web. The access to the data is controlled by the BOM application 180.

One aspect of the invention is to provide a mechanism for determining which users have what privileges on which data. In particular, an aspect of the invention is the automatic generation of access privileges and views to different users depending on the roles of the users. The setup of access privileges and views are traditionally a time consuming, error prone and labor-intensive process. There is thus a need to automate this process.

Because security is of great concern to users of a service in which user data is maintained in a shared database, in one embodiment, data such as BOM data such as a BOM stored in the database 186 for an account holder belongs to a single workspace. A workspace is a group of data, over which the same access rules apply. In one embodiment, each workspace has an owner, i.e., a entity such as a company. One embodiment includes some common data provided for convenience, e.g., common conversion factors and currency data, that is made available to all workspaces. While in the majority of cases, an account holder maintains a single workspace, a single account holder may maintain, i.e., own, multiple workspaces. For example, a consulting company may wish to maintain different workspaces for different consulting clients.

One embodiment of the invention uses a relational database that comprises a set of tables and relationships between the tables for the database 186. Other types of databases, such as object oriented databases also may be used. The invention, however, shall be described herein using a relational database tables.

The following are the elements of the database. The application maintains a table of table of users, such as table bc_users shown in representative form in FIG. 4A. In one embodiment, each user is identified by the user's email address. This provides a unique identifier and also makes contacting the user straightforward. Other columns of the table include other details about the user such as who "owns" the user and which workspace the user is currently "in" (see below), and the password or other authenticating information. The system also maintains table of accounts shown in FIG. 4B as table bc_accounts. An entity such as a corporate entity has an account on the system. Each user of the system is owned by, i.e., belongs to an account as indicated by the account_ID column in the bc_users table. The system maintains an account and a user who is not "owned" by another account holder by default is owned by the system account.

FIGS. 5A–5G show the tables that in one embodiment are maintained for a single workspace in database 186. Each workspace includes a master item list of items that may appear in a BOM in that workspace. An item in this list may be an item, a document, or a proxy. The master item list is in the form of a table bc_items shown in FIG. 5A. The identifying column that other tables may refer to is the item_ID column. Only some of the columns are shown in the drawing. Note in this description, a column named <column_name> of a table named <table_name> is denoted by <table_name>.<column_name>.

The workspace also maintains a list of entities, e.g., corporate and workspace entities. The entities are described in a table called the master supplier list table bc_entities shown in FIG. 5B. The identifying column for an entity is bc_entities.entity_ID. Like users, entities belong to an account as indicated by the account_ID column in the bc_entities table. In one embodiment, some entities are workspace entities which can own data in the system, i.e., can be referenced in the "owner" column in other tables in the system, while other entities represent suppliers or potential suppliers of items within a workspace, and cannot be owners. also In this embodiment, there is a column bc_entities.can_own_that indicates whether or not an entity is a workspace entity. Note that the "_p" is used herein to denote a column that contains a flag, i.e., has a Boolean value, e.g., true or false. An aspect of this embodiment is that certain corporate entities can simultaneously be workspace entities, so that a supplier who owns a workspace may be a manufacturer of a subassembly that is identified as a supplier item in another workspace. In another embodiment, the system maintains a separate list of workspace entities that is different from the list of suppliers within each workspace. In this embodiment, the list of workspaces may include an identifying column which is referenced by the "owner" column in each workspace specific table.

Each entity in the master supplier list bc_entities may have has one or more contacts identified in a column bc_entities.contact_ID. A contact is identified, for example by the contact's email address and is a user or potential user. Each entity that can be an owner has to have at least one contact who is a user and who is designated to be an administrative user of the workspace and who has the authority to set access privileges to the workspace for themselves and other users. A contact need not be a user in the system. For example, a workspace may contain identifying data for the contact of a supplier but the administrative user of a workspace may choose not to invite that contact to become a user. Alternatively, the administrative user may invite the contact to become a user, in which case the contact may agree or not. If the contact agrees to become a user, he or she is owned by either the account held by the supplier if the supplier has an account in the system, or by the system itself in the case that the supplier does not have an account.

In one embodiment, a supplier item list is also maintained. This is a list of items that a supplier entity can provide. The items in the supplier item list need not be and typically are not included in BOMs, i.e., in the master item list bc_items, and not all embodiments of the invention include the supplier item list. The supplier item list is shown as bc_supplier_item in FIG. 5G.

The database 186 also includes for each workspace tables that describe relationships. A first relationship table describes the relationships in BOMs. The table describing the parent child relationships that comprise a BOM is the item assembly map table shown in simple form as table bc_items_assembly_map in FIG. 5D. This table describes the parent of any item if a parent exists, and the one or more children of any item if the children exist. A BOM is describable as a tree. The root of the tree is the base item of a BOM. When a parent item and a child item are referenced in a single record of the bc_items_assembly_map table, this indicates that the parent item contains the child item in its BOM. An item that has no children, i.e., a leaf item, is a single component, process, or document that contains no further items.

Each workspace also maintains a second relationship table that describes the sourcing relationship between an item in the master item list bc_items and a supplier in the master supplier list bc_entities. The table that describes the sourcing relationship is called the item source map table bc_items_source_map shown in simple form in FIG. 5C. The table maps an item in the master item list bc_items to a supplier in master supplier list bc_entities with the column bc_item_source_map.entity_id. In the embodiment that includes a supplier item list bc_supplier_item, one of the columns in the item source map table bc_items_source_map relates the item from the item list bc_item to an item in the supplier item list bc_supplier_item. By purchasing such an item, the item in the supplier item list bc_supplier_item becomes an item in the item list bc_items. As an example, suppose some supplier X has a catalog item ABC. Furthermore, suppose a design includes an item Z for which X's part ABC may be used. Providing the part ABC in the supplier item list bc_supplier_item provides the information of this availability, and providing the link in bc_items_source_map between item Z in the bc_items and and ABC in item list bc_supplier_item provides the information that ABC is suitable for item Z. Note that other instantiations also may be used for item Z. In the embodiment that includes the bc_supplier_item table, once the link is made between an item and an item in the bc_supplier_item table, it is not necessary to explicitly designate the supplier with the column bc_items_source_map.entity_id, and this column may be omitted In one embodiment, the table bc_item source_map contains a column "item_sell_p" which may be used to indicate whether the item is purchased from or sold to the specified supplier entity. In another embodiment, this column is omitted and sold items are either not indicated or are indicated by other means.

Thus, an entity in the database that owns a workspace can own a master item list, a master supplier list and relationship maps in its workspace, and in the embodiment that includes the supplier item list, the entity can also own a supplier item list.

In one implementation, the bc_supplier_item and the bc_items tables are maintained in one table, and views are set up to display the two sets data as if in separate tables.

Note that while in the description above, which workspace a table of the set of tables belongs to is indicated by the owner column, i.e. the database maintains a single partitioned bc_users table, a single partitioned bc_entities table, a single partitioned bc_items_assembly_map table, and so forth, with each partition allocated to a workspace and indicated by the value of owner, in an alternate embodiment, each workspace has its own set of tables, i.e., its own bc_users, its own master supplier list bc_entities, its own assembly map bc_items_assembly_map, and so forth.

One aspect of the invention is linking the process of describing a product—i.e., the process of creating and maintaining a master item list, building a BOM, providing supplier information, and providing sourcing relationships to the process of providing different types of access privileges to different users, for example the privilege to view or not and to change or not different items of data.

An administrative user of a workspace, acting as a representative of the corporate entity that has an account in the system and which owns a workspace, can assign to a user one or more "roles" within the workspace. According to one aspect of the invention, each role has an associated set of rules that define privileges such as the type of data a person holding that role may and may not view, and the type of data a person holding that role may and may not edit. The rules that define privileges may rely on an association between the user and the data that describes a product, for example, a user may be associated with a supplier listed in the master supplier list for the workspace, and that association may be used determine that the user has different privileges with respect to items that have a sourcing relationship to that supplier than they have to items that lack such a sourcing relationship. Alternatively, a user may be identified as the "responsible engineer" or "creator" for a data element, and may therefore have special privileges with respect to that data element. Thus, assigning a role to a user automatically assigns the privilege rules associated with that role to that user for data in that workspace, and the determination of particular privileges to each data element is determined at the time of access by applying the privilege rules, which may include consideration of the current values of the data element itself or related data elements.

According to one embodiment, an administrative user of a workspace assigns roles, in another embodiment roles are assigned by another mechanism, i.e., by virtue of the user belonging to an account which is identified with a supplier entity in the table bc_entities. Thus a user may have a role, and the role automatically defines a set of privilege rules for that user for selected data. One aspect of the invention includes providing a mapping between the access privileges to data and the roles users of the data have for the data such that the access privileges appropriate for the role, e.g., in the form of settable privileges for each role, are automatically set when the role of the individual is assigned.

An administrative user may also grant access to a person who is not yet a user of the system, i.e., a person who does not have a user ID. Such a person, for example, may be a contact person for a supplier. When an owner, e.g., the administrative user, invites a person to become a user, the owner enters the email address of the potential user. The application sends an email to that individual inviting the person to become a user. If the person agrees, that the application grants the person user privileges. The owner of the workspace may now grant the new user a role. Note that when a user is not owned by one of the entities in the workspace, the user is by default owned by the "system."

A user may activate any one of a number of workspaces, based on the access granted to him or her. With different workspaces activated, a user will see items in the "scope" and from the "perspective" of that workspace. In one embodiment, the activated workspace for each user is indicated by the column current_workspace in the table bc_users, which references the entity_id of a workspace entity. Any data the user creates in his or her current workspace will be owned by that workspace.

In one embodiment of the invention, four different roles are defined that an individual user might have with respect to data in a workspace. The particular privilege rules that are automatically assigned when a user is granted a role, i.e., an access type, are maintained in a table shown as table bc_roles in FIG. 5F. The identifying column for a role is bc_roles.access_type. The table bc_roles (see FIG. 5F) lists these roles and defines which privilege rules are automatically assigned when a user is granted a role. The table maps to each access_type a set of flags—column is priv_1_p, priv_2_p, and so forth, that indicate the type of privilege rules to be applied for various types of data. The combination of privilege rules for each role defines a type of access, so that four different types of accesses are defined. An access table bc_access (see FIG. 5E) provides data on the access type, if any, each user has to the data in each workspace. The table bc_access includes columns indicating user (bc_access.user_id), workspace (bc_access.owner), and role (bc_access.access_type). In addition, there is a column for associating this user's access with a supplier in the master supplier list for the workspace (bc_access.access_context), which refers to a supplier entity in the table bc_entity. The column bc_access.access_context may have no value or have a value which refers to the workspace entity identified in the column bc_access.owner, no value being the case the user's access is not associated with any particular supplier entity. The invention may readily be modified to include more or fewer types of roles and access types, and how to so modify the invention would be clear to one skilled in the art. The inventors decided on four roles after examining how different users and anticipated users may interact with the BOM application 175, the BOM data created, and data other people create. The four access types are:

1. Employee (access type employee): a user who has access type employee for a workspace can see all data that belongs to this workspace. Users with access type employee are required to belong to the same account that owns the workspace (the value for the user in column bc_users.account_id must be the same as the value for the workspace entity in the column bc_entities.account_id). In addition, only users who have has access type employee for a workspace may be designated as administrative users for the workspace.

2. Partner: (access type partner) a user who has access type partner can see all data that belongs to this workspace but does not see data shared by other workspaces to "all employees" of this workspace. Users with access type partner are required to belong to the a different account from the one that owns the workspace (the value for the user in column bc_users.account_id must be the different from the value for the workspace entity in the column bc_entities.account_id).

3. Component Supplier (access type component_supplier): a user who has access type component_supplier for the workspace can see some or all related and additional information for items in the table bc_item which (1) have one or more sourcing relationships as defined in the table bc_item_source_map between the item and the supplier entity identified in the column bc_access.access_context, and which (2) are specified as "shared to suppliers" as indicated by a flag in the supplier_shared_p column of the bc_item table. For this type of access, the column bc_access.access_context is required to refer to a supplier entity in the workspace.

4. Contract Manufacturer (access type contract_mfg): a user who has access type contract_mfg can see some or all related and additional information for items in the table bc_item which (1) have one or more sourcing relationships as defined in the table bc_item_source_map between the item and the supplier entity identified in the column bc_access.access_context, (hereinafter referred to as supplied items) and which (2) are specified as "shared to suppliers" as indicated by a flag in the supplier_shared_p column of the bc_item table. In addition, a user who has access type contract_mfg can see related and additional information for items in the table bc_item which (1) are either supplied items or are in the BOM of supplied items (that is, are children of the supplied items as indicated in the table bc_item_assembly_map), and which (2) are specified as "shared to suppliers" as indicated by a flag in the supplier_shared_p column of the bc_item table. For this type of access, the column bc_access.access_context is required to refer to a supplier entity in the workspace.

An individual user may hold any number of access grants of any type on any workspace as long as such a grant does not create a redundancy (unique user_id, owner, access_type, etc.). Thus, a user can have employee access to multiple workspaces or multiple contract mfg access.

In another embodiment, a fifth access type is defined, as follows:

5. Customer (access type customer): a user who has access type customer can see some or all related and additional information for items in the table bc_item that are "shared to customers" (as indicated by bc_items.customer_shared_p) and, possibly, if they are a buyer for that item, that is, there is one or more sourcing relationships defined in the table bc_item_source_map between the item and the supplier entity identified in the column bc_access.access_context, and which are indicated as "selling relationships" in bc_item_source_map.sell_item_p).

Component supplier, contract manufacturer, and customer access are granted to a user for a specific context described by bc_access.access_context. This is the context in which the user is being granted access to the sharing workspace (bc_access.owner). Since component_supplier and contract_mfg access are derived from a sourcing relationship, a definition is provided to the system of which workspace must be on the other side of that sourcing relationship from the sharing workspace for the user to see the item and related data. In other words, if a user John Doe (e.g., having user_id jdoe@xxx.com) is an employee of, i.e., has employee type access to two contract manufacturers, "PCBs-R-Us" (e.g., having entity_id 3) and "CircuitMaster" (e.g., having entity_id 5), when "Gadgets Intl", an OEM who sources assemblies to both contract manufacturers, gives John Doe contract_mfg type access for the OEM's workspace, "Gadgets Intl" must also specify for which context (Gadgets Intl's PCBs-R-Us assemblies or Gadgets Intl's CircuitMaster assemblies) such access is being granted. In one embodiment, there is no requirement that a user be an employee of, i.e., have employee type access to a workspace owned by a supplier entity in order to receive access to another workspace with the context of that supplier entity. This provides for a workspace to grant a user access "as though" the user were an employee of the specified supplier entity even if the user is affiliated with a different supplier entity.

In one embodiment, access is also grantable to "all employees" of the access_context. In one embodiment, this is specified with some indication in the bc_access.user_id column that the grant is to all employees.

In a typical situation, to determine whether to grant access when requested, the BOM application first runs a relatively simple query, i.e., computationally cheap query on database 186 to determine if the user has employee or partner access to the active workspace. If so, the application fetches all workspace data-easily delineated by owner =XX— matching the search criteria. If not, the application runs a more complex query to limit the returned data returned according to the rules described above.

In one embodiment, the access control system is implemented in stored procedures in the BOM database 186 so as to improve application security.

Figure 6:
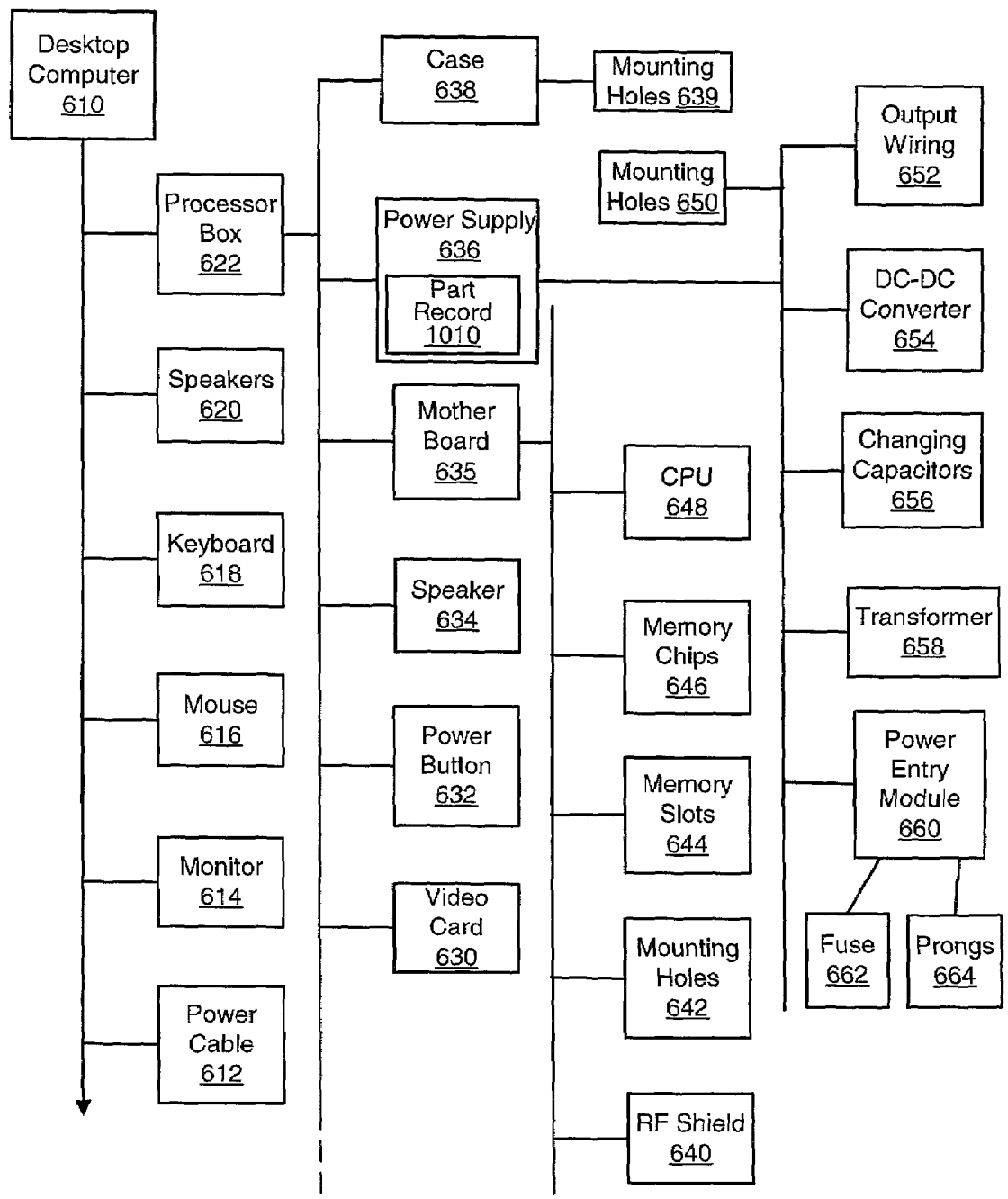
FIG. 6 illustrates a simplified BOM 605 for a desktop computer for operation according to one embodiment of the invention.

A detailed example is now presented. FIG. 6 illustrates a simplified sample BOM 605 for a desktop computer 610. The BOM is representable as a tree of items, each node of the tree being an item. For purposes of illustration, only a portion of items included in BOM 605 are shown in FIG. 6. The desktop computer 610 is divided into sub-parts power cable 612, monitor 614, mouse 616, keyboard 618, speakers 620, processor box 622, and other elements not shown. Each of these components of desktop computer 610 is further made up of into one A or more components and subassemblies. For the purposes of illustration, one subassembly, the processor box 622 is described. Processor box 622 is made up of video card 630, power button 632, speaker 634, motherboard 635, power supply 636, case 638, and other elements not shown. Motherboard 635 is further made up of into RF shield, 640, mounting holes 642, memory slots 644, memory chips 646, CPU 648, and other elements not shown. Power supply 636 is further made up of mounting holes 650, output wiring 652, DC—DC converters 654, charging capacitor 656, transformer 658, power entry module 660, and other elements not shown. Power entry module 660 is further made up of fuse 662, prongs 664, and other elements not shown.

The information in the BOM shown in FIG. 6 is encoded in the tables of database 186 as follows. When a user enters the BOM, the different parts are also entered (if not already present) in the bc_items table. The realtionships are entered, if not laready present, in the table bc_item_assy_map.

Each item in the BOM 605 (i.e., each node of the BOM tree) may in addition have related data that is stored in database 186. The data that may be included in as related data for an item may include fields such as supplier (vendor) information, such as vendor name price schedule, delivery, and vendor history. The related data for an item may further include one or more alternative vendors, inventory of the item at hand, quantity, specifications such as weight, color, and other technical specifications. Such other specifications may include, e.g., for an electronic component, such specifications as voltage range. For a mechanical part, it may include mechanical drawing, and also a link to any additional data that is stored elsewhere, e.g., in the data server.

The related information about an item is typically entered by the designer of each item or some other user. Entering this data fills fields in such tables as the item source map bc_item_source_map. Details about a vendor would fill entries in the bc_entity table.

Figure 7:
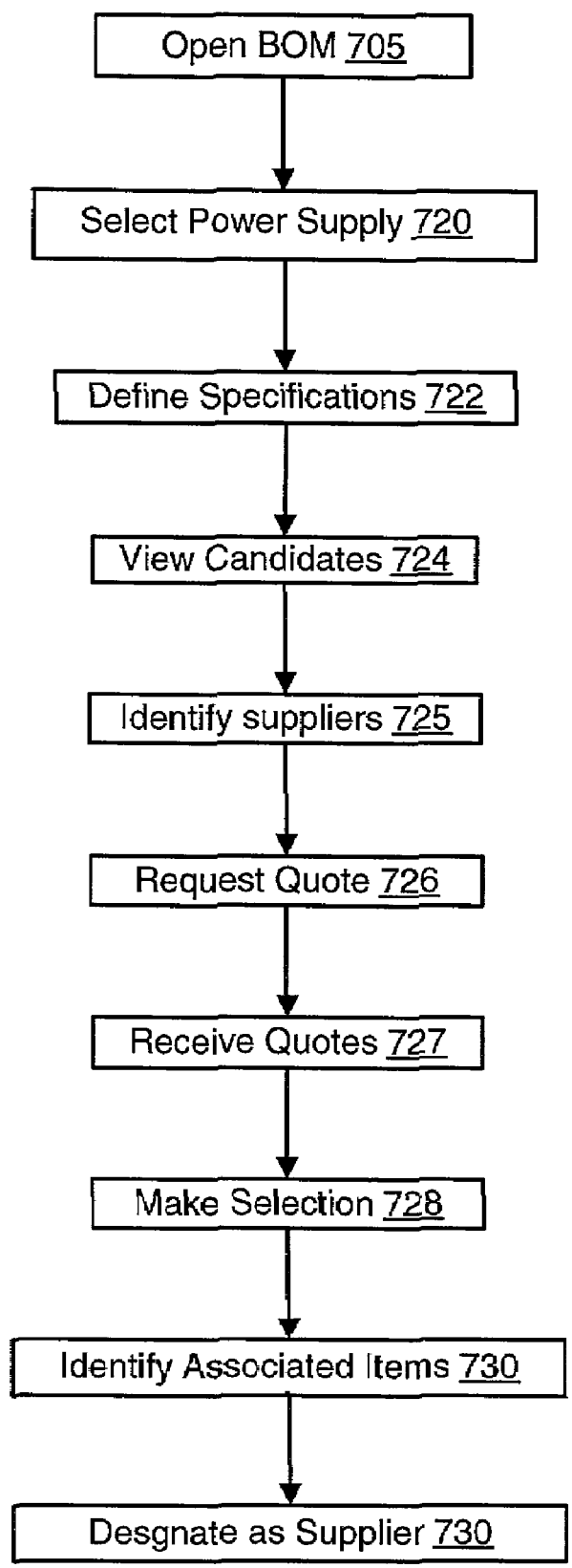
FIG. 7 illustrates a process in which access is automatically set for a series of components according to one embodiment of the invention by adding associated data for an item into a BOM.

FIG. 7 illustrates how related data for power supply 636 may be specified during the development of BOM 605 or later. In a step 705 a user opens BOM 605. This typically occurs by accessing the BOM application 180 from user client 110 via the browser. The BOM application in turn accesses the database 186. In a step 720 power supply 636 is selected. The steps of adding associated data may include one or more of sub-steps 722, 724, 725, 726, 727, and 728 that are shown to illustrate details of the process. One or more of these or similar sub-steps may also be carried out when specifying other items of the BOM. These sub-steps are optional. The sub-steps do not all necessarily occur at the same session. In step 722 the user may defines a specification of a desired part. For power supply 636 a predefined "power supply" class may be available, so this class is used to quickly setup the appropriate data records and fields. In step 724 the specification or other criteria are used to search for commercially available parts that meet the user's needs and candidate products are viewed. For example, there may be such a power supply already available from one or more suppliers. This would be indicated by one or more entries on the bc_supplier_item list for embodiments that use such a list, and the information in this list would be provided to the user via some appropriate user interface. In step 725, candidate suppliers are selected. As a result of this selecting, entries would be entered into the table bc_item_source_map. In step 726 the user is provided with the option of issuing manual or automatic requests for quotes on available parts. This may includes selecting one or potential suppliers. This may also include inviting a contact of a supplier to become a user.

At some later time, e.g., in step 727 quotations are received. In step 728 a specific item and vendors are chosen. The contact of the vendor may now be given a role. Setting of that role automatically provides a set of privileges. The user is can also edit default settings that determine which data associated with the item will be shown in the different standard views. For this example, suppose the vendor is given the role of supplier. As a supplier, a contact of the vendor can view data within the BOM 605 related to items the vendor supplies, such as power supply 636, including, for example, the requirements. The vendor for example, may access some of BOM 605, in particular, some information related to items supplied by the vendor. Thus, the vendor may also enter some data, such as some technical specification. In a step 730 all parts within BOM 605 that are associated with power supply 636 such as power cable 612 and mounting holes 639 are identified. If the association is appropriate for the vendor of power supply 636, in step 735 the vendor is also entered into the data source map for these items so that the vendor may view data related to these items.

As a result, a vendor of the power supply item may then have access privileges related to that vendor's role, i.e., a component supplier, to one or more items in BOM 605.

Another aspect of the inventions providing peer to peer views. Several BOMs can be associated with a user. As discussed above different users are provided a different set of privileges depending o the role they have in that workspace and the relationship they hold to a particular item in a BOM.

Figure 8:
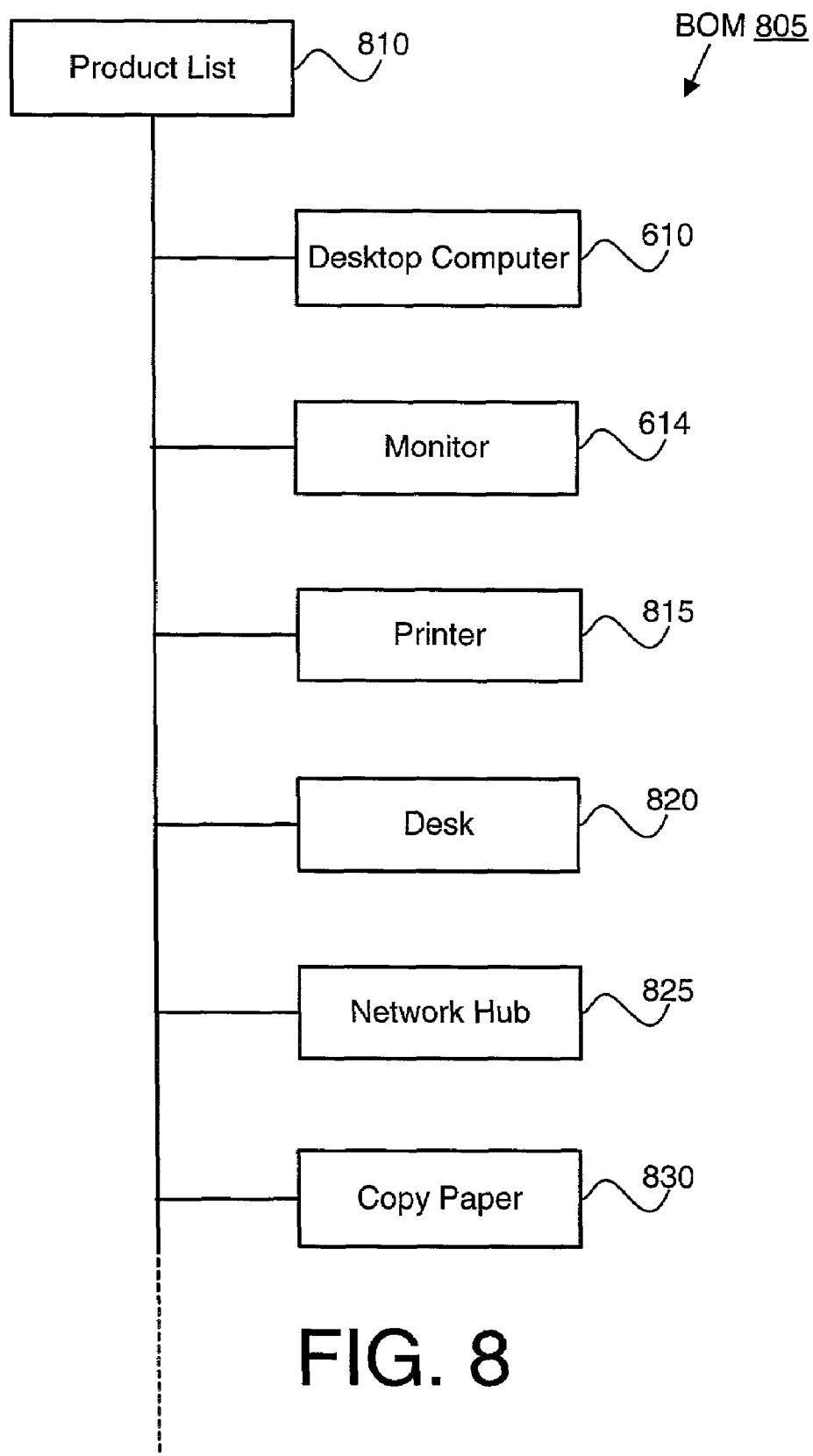
FIG. 8 illustrates a view of a BOM in which a desktop computer is one of many elements according to one embodiment of the invention.

In one embodiment BOM 605 includes parts available from a vendor. For example desktop computer 610 of BOM 605 can be an item offered for sale by BOM 605's owner. Data within BOM 605 is made available as pricing or technical details to potential buyers. FIG. 8 illustrates a view of a BOM 805 in which desktop computer 610 is one of many elements. Under these conditions BOM 605 is a sub-tree of parent BOM 805. As a sub-tree the "customer" view of BOM 605 is limited to data to be made available to a customer. This view is automatically generated using the structure of BOM 605. Note that an item can occupy more than one level in a BOM. In BOM 805, monitor 614 is both a subcomponent and peer of desktop computer 610.

Since all BOMs have similar architectural elements, a manufacturer with a BOM 605 and a supplier with a available list of parts can be treated in an equivalent manner. BOMs owned by customers and suppliers have a peer to peer relationships and data within BOMs can be shared on a two way basis. One party sees a customer view while the other sees a supplier view. Both sides have automatically generated views and privileges. Data can be imported between BOMs. As an example, if a customer selects power supply 636 from a supplier, the supplier's BOM includes much of the data found beneath the power supply 636 node in the BOM 605 tree. When the power supply 636 is selected this data is optionally automatically linked to the manufacturer's (supplier's customer) BOM 605. The link allows changes in the suppliers BOM to be automatically reflected in the manufacturer's BOM 605.

Figure 9:
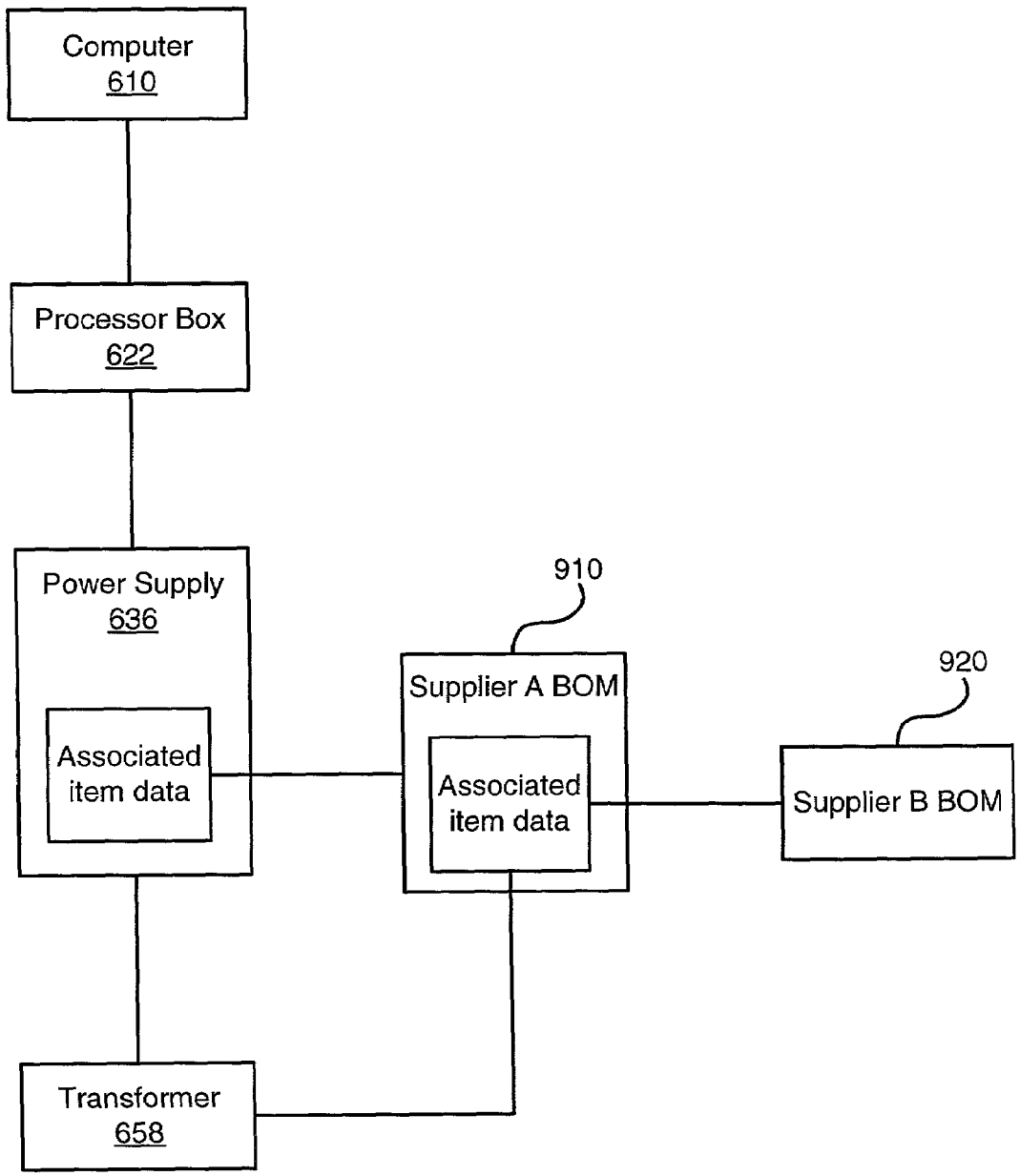
FIG. 9 illustrates links between BOMs according to one embodiment of the invention.

Links between BOMs are illustrated in FIG. 9. This block diagram shows a branch of BOM 605. The top element is computer 610. A view of this element is made available to customers. Processor box 622 is a sub component of computer 610. These two components are parts of the BOM 605 that are entirely controlled by the owner of BOM 605. Power supply 636 is a subcomponent of processor box 622. The item data associated with power supply 636 includes direct links to supplier A's BOM 910. Likewise, transformer 658, which is a sub component of power supply 636, has direct links to supplier A's BOM 910. Supplier A's BOM is in turn be comprised of different associated item data for the BOM items with direct links to supplier B's BOM 920, wherein supplier B makes transformer 658.

Figure 10:
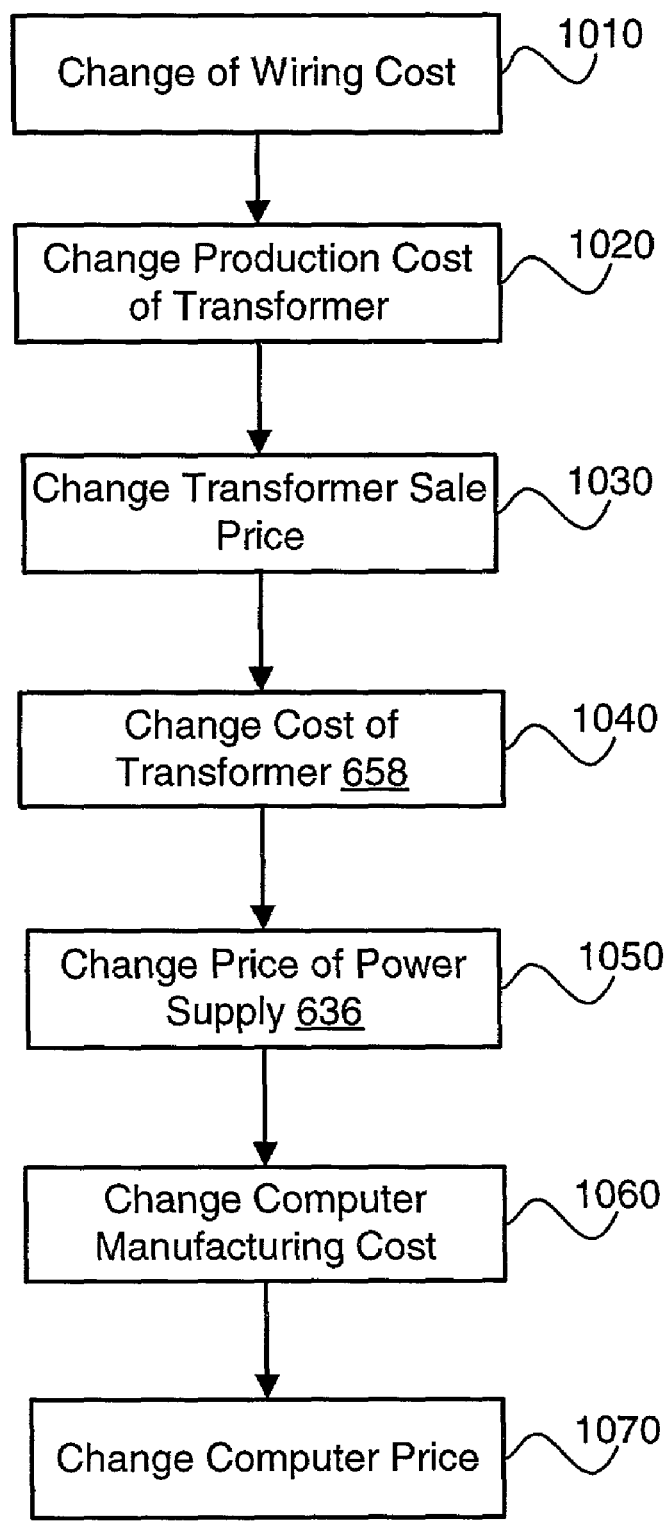
FIG. 10 illustrates a process in which a change is automatically passed along a supply chain from a first party to a second and from the second to a third according to one embodiment of the invention.

An important aspect of peer to peer relationships between BOMs is the ability to automatically update information between parties. For example, if a technical specification or price is altered by a supplier in the supplier's BOM, this information is automatically updated in a manufacturer's BOM 605. If the manufacturer is calculating a cost based on BOM 605 the total cost is updated to reflect the supplier's change in price. At the next level the manufacturer has the option of showing an adjusted price in the view of the manufacturer's BOM 605 shown to customers. Through these means a change is automatically passed along a supply chain from a first party to a second and from the second to a third. This process is illustrated in FIG. 10. In a step 1010 supplier B incurs a change in the cost of wiring transformer 658. Supplier B accounts for this change and, using methods of the invention, observes, in a step 1020, that the change in wiring cost results in a change in the cost of producing transformer 658. Supplier B chooses to pass this change in cost onto its customers and, therefore, in a step 1030 changes the sale price data within supplier B's BOM 920. This price data is directly linked to Supplier A's BOM 910 so that, in a step 1040, the price change is seen as a change in the cost of manufacturing power supply 636. In a step 1050, if supplier A chooses, the change in cost is passed on to supplier A's customers. Finally, in steps 1060 and 1070, the change is optionally reflected in BOM 605 as a change in the manufacturing cost and price of computer 610.

In the above example, each BOM owner makes a decision to follow a change in cost by a change in price. However, other changes are also automatically propagated through the supply chain. For example, if the change in property that occurred at step 1010 was a change in weight of the transformer core, the change is automatically cascaded through each BOM and appear as a change in the weight of computer 610 without any manual intervention. When a BOM is used to present a distributor's catalog to potential customers, price changes from manufacturers are preferably used to automatically adjust list prices. Such automatic updating of prices through multiple parties is of significant utility.

The use of interlinked data to pass changes through multiple layers of a supply chain is a significant aspect of the invention. Changes are preferably passed in both directions along the supply chain. For example, changes to requirements can be passed down from customers to suppliers.

Figure 11:
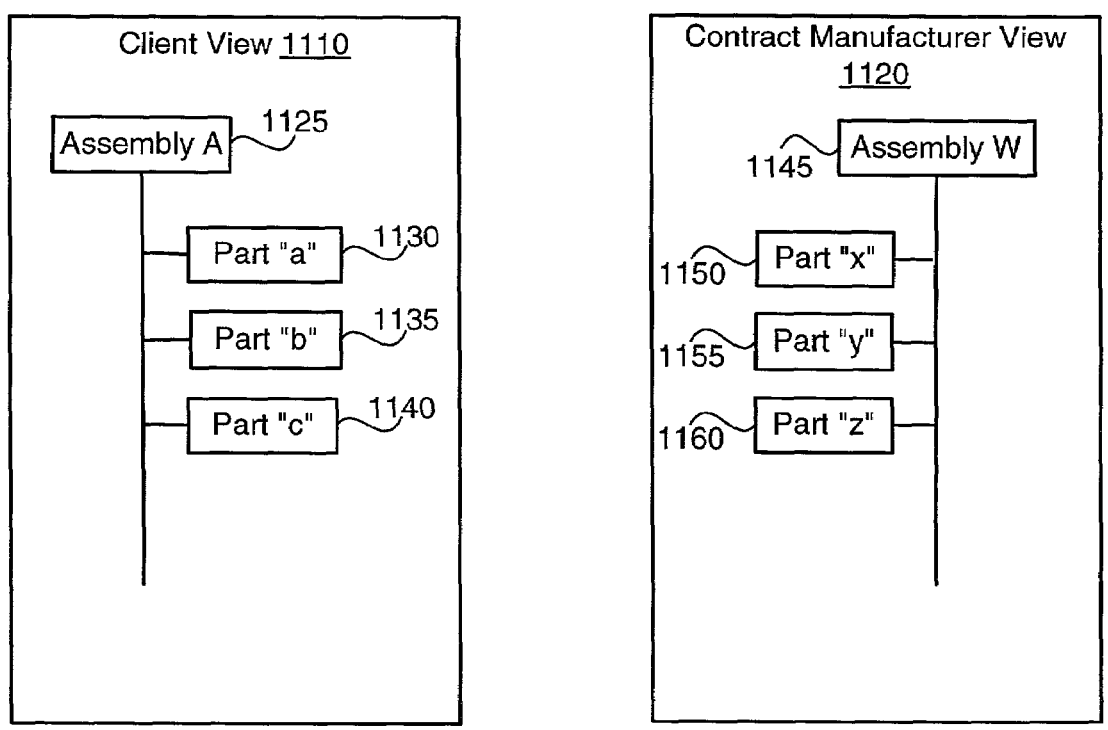
FIG. 11 illustrates how an assembly and its individual parts is viewed by two parties according to one embodiment of the invention.

Views of a BOM preferable include aliasing and version control. Aliasing allows a buyer and a seller to view specific items using customized labels. This aspect of the invention is of utility because each party typically has different identification mechanisms or part numbers for the same items. FIG. 11 illustrates how an assembly and its individual parts is viewed by two parties. The figure shows a client view 1110 and a contract manufacturer view 1120 of the same BOM. The client view 1110 shows assembly A 1125 comprised of parts "a" 1130, "b" 1135, and "c" 1140. In contrast, the contract manufacturer view sees the same elements as assembly W 1145, and parts "x" 1140, "y" 1145, and "z" 1160. "Assembly A" 1125 is aliased to "Assembly B" 1145 and part "a" 1130 is aliased to part "x" 1140, and so forth. Data regarding alternative aliases for a part and the parties that use each of those aliases may be stored as part of the data for the item stored in a BOM. An aspect of the invention automatically detects this data and uses it when presenting views.

Figure 12:
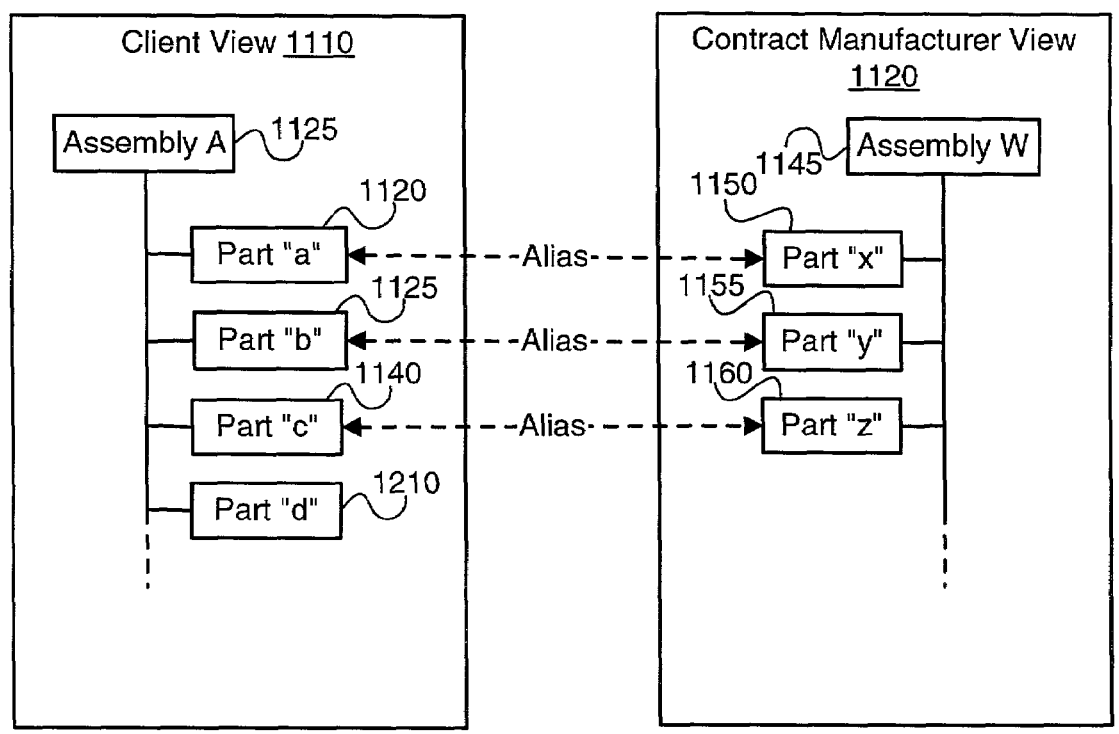
FIG. 12 illustrates in an example the new views assuming a forth part is added to the BOM viewed in FIG. 11 by the client, according to one embodiment of the invention.

Changes to BOMs and views of BOMs are optionally managed using version control. Any party can take and work with a "snapshot" of a BOM to preserve a specific state and to enable ACID protocols and insure the integrity of transactions with BOM data. Versions and views of a BOM are compared to detect differences or changes. One type of view is designed to show the difference between two other views. For example, assuming a forth part, part "d" 1210, is added to the BOM viewed in FIG. 11 by the client, the new views are shown in FIG. 12. A difference view between the new client view 1110 and a previous contract manufacturer view 1120 shows that part "d" 1210 is a new element without a corresponding alias.

It should be appreciated that although the invention has been described in the context of a configuration such as shown in FIG. 1, the invention is not limited to such an architecture, and may be implemented in a system having an alternate architecture. For example, the user client need not be part of a local area network, but may directly connect with the external network.

It should further be appreciated that the distinction between related data which is stored directly in the BOM database and additional data which is stored externally to the BOM database is highly dependent upon the details of the embodiment. In some embodiments, some or all binary data about an item may be stored and accessed as part of the BOM data. In other embodiments, some types of textual information related to an item may be stored as additional data due to limitations in the design and implementation of the BOM database.

Note further that although method embodiments of the invention have been described, another embodiment is in the form of a carrier medium carrying one or more computer readable code segments, the code segments implementing the steps of a method.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

What is claimed is:

1. A method comprising:
 storing a plurality of bills of material (BOMs) in a processing system, each BOM describable as a tree with each node an element, each BOM being associated with an owner of a set of owners, such that BOMS associated with different owners are stored in the same processing system; and
 uploading data via a network from a local file system for storage in a data server for association with a particular BOM of the BOMs, wherein the uploading includes:
  selecting the data for upload and linking to the particular BOM;
  requesting the upload from an application program;
  receiving from the application program a redirect to the data server:
   sending the data selected for upload to the data server according to the redirect;
   at the data server, receiving a ticket issued and authorized by the application program;
   at the data server, storing the data in encrypted form; and
   linking the stored data with the particular BOM to form additional information for the particular BOM,
 such that different users may be assigned different remote access privileges to the uploaded data, the assigning of privileges automatic according to the role assigned to the user or an entity of which the user is an employee.

2. A method comprising:
 receiving an upload request from a client system over a network, the upload request including authentication information of a user, and identifying data to be uploaded for storage in a data server, the upload request further including identifying information of a particular bill of material (BOM) with which the data is to be associated, the BOM stored in a processing system with at least one other BOMs, each BOM describable as a tree with each node an element, each BOM associated with an owner of a set of owners, such that BOMS associated with different owners are stored in the same processing system;
 issuing a redirect to the data server and issuing a ticket, such that the data and the corresponding issued ticket can be sent to the data server;
 receiving the previously issued ticket for the data for authorization;
 authorizing the previously issued ticket;
 communicating the authorization to the data server, such that the data server, receiving the identified data and the authorized ticket, stores the data in encrypted form, and sends results of the storing; and
 receiving from the data server an acknowledgement of the result of storing of the data, and updating the particular BOM accordingly, such that different users may be assigned different remote access privileges to the uploaded data, the assigning of privileges automatic according to the role assigned to the user or an entity of which the user is an employee.

3. A method as recited in claim 2, wherein unrestricted access to the stored data is limited to the owner and any designates of the owner of the BOM.

4. A method as recited in claim 2, wherein the data is received at the data server in secure form.

5. A method as recited in claim 4, wherein the encrypting of the data for storage occurs at the client, such that the data server does not receive the encryption key.

6. A method as recited in claim 2, wherein the ticket includes a key to use for encryption.

7. A method as recited in claim 6, wherein the encrypting of the data occurs at the data server prior to storage.

8. A method as recited in claim 6, wherein the key is a one way key such that a different key is needed for decryption.

9. A method comprising:
 receiving a download request from a client system over a network, the download request including information identifying the data to be downloaded, the data stored in encrypted form in a data server and associated with a particular bill of material (BOM), the BOM stored in a processing system with at least one other BOMs, each BOM describable as a tree with each node an element, each BOM associated with an owner of a set of owners, such that BOMS associated with different owners are stored in the same processing system;
 issuing a ticket to the client, including information on the location of the data in the data server;
 receiving from the data server the previously issued ticket for authentication as a result of the data server receiving from the client a data server download request and the previously issued ticket;
 authorizing the previously issued ticket, such that the data server is authorized to send the stored data to the client, and such that the data can be decrypted;
 decrypting the stored data; and
 sending the decrypted data to the client.

10. A method as recited in claim 9, wherein the data is sent to the client in secure form.

11. A method as recited in claim 9, wherein the key to decrypt the data is sent to the client, and wherein the decryption occurs at the client, such that the data server has no access to decrypting keys.

12. A method as recited in claim 9, wherein the authorizing includes, when successful, sending the decryption key to the data server, and wherein the decryption occurs at the data server.

13. A method as recited in claim 9, wherein the ticket includes the decryption key to use for encryption, such that the data server download request includes the decryption key.

14. A method as recited in claim 9, wherein the key to decrypt the data has a short validity time.

15. A method as recited in claim 9, wherein the key to decrypt the data is a use once key.

16. A method as recited in claim 9, wherein the data is stored in encrypted form encrypted by a one way key such that a different key is used for decryption than was used for encryption.

17. A carrier medium carrying one or more computer readable code segments to instruct a processor of a processing system to execute a method, the method comprising:
 receiving an upload request from a client system over a network, the upload request including authentication information of a user, and identifying data to be uploaded for storage in a data server, the upload request further including identifying information of a particular bill of material (BOM) with which the data is to be associated, the BOM stored in a processing system with at least one other BOMs, each BOM describable as a tree with each node an element, each BOM associated with an owner of a set of owners, such that BOMS associated with different owners are stored in the same processing system;

issuing a redirect to the data server and issuing a ticket, such that the data and the corresponding issued ticket can be sent to the data server;

receiving the previously issued ticket for the data for authorization;

authorizing the previously issued ticket;

communicating the authorization to the data server, such that the data server, receiving the identified data and the authorized ticket, stores the data in encrypted form, and send results of the storing; and receiving from the data server an acknowledgement of the result of storing of the data, and updating the particular BOM accordingly, such that different users may be assigned different remote access privileges to the uploaded data, the assigning of privileges automatic according to the role assigned to the user or an entity of which the user is an employee.

18. A carrier medium as recited in claim 17, wherein unrestricted access to the stored data is limited to the owner and any designates of the owner of the BOM.

19. A carrier medium as recited in claim 17, wherein the data is received at the data server in secure form.

20. A carrier medium as recited in claim 19, wherein the encrypting of the data for storage occurs at the client, such that the data server does not receive the encryption key.

21. A carrier medium as recited in claim 17, wherein the ticket includes a key to use for encryption.

22. A carrier medium as recited in claim 21, wherein the encrypting of the data occurs at the data server prior to storage.

23. A carrier medium as recited in claim 21, wherein the key is a one way key such that a different key is needed for decryption.

24. A carrier medium carrying one or more computer readable code segments to instruct a processor of a processing system to execute a method, the method comprising:

receiving a download request from a client system over a network, the download request including information identifying the data to be downloaded, the data stored in encrypted form in a data server and associated with a particular bill of material (BOM), the BOM stored in a processing system with at least one other BOMs, each BOM describable as a tree with each node an element, each BOM associated with an owner of a set of owners, such that BOMS associated with different owners are stored in the same processing system;

issuing a ticket to the client, including information on the location of the data in the data server;

receiving from the data server the previously issued ticket for authentication as a result of the data server receiving from the client a data server download request and the previously issued ticket;

authorizing the previously issued ticket, such that the data server is authorized to send the stored data to the client, and such that the data can be decrypted;

decrypting the stored data; and sending the decrypted data to the client.

25. A carrier medium as recited in claim 24, wherein the data is sent to client in secure form.

26. A carrier medium as recited in claim 24, wherein the key to decrypt the data is sent to the client, and wherein the decryption occurs at the client, such that the data server has no access to decrypting keys.

27. A carrier medium as recited in claim 24, wherein the authorizing includes, when successful, sending the decryption key to the data server, and wherein the decryption occurs at the data server.

28. A carrier medium as recited in claim 24, wherein the ticket includes the decryption key to use for encryption, such that the data server download request includes the decryption key.

29. A carrier medium as recited in claim 24, wherein the key to decrypt the data has a short validity time.

30. A carrier medium as recited in claim 24, wherein the key to decrypt the data is a use-once key.

31. A carrier medium as recited in claim 24, wherein the data is stored in encrypted form encrypted by a one way key such that a different key is used for decryption than was used for encryption.

* * * * *

UNITED STATES PATENT AND TRADEMARK OFFICE
CERTIFICATE OF CORRECTION

PATENT NO.    : 6,983,278 B1
DATED         : January 3, 2006
INVENTOR(S)   : Yu et al.

It is certified that error appears in the above-identified patent and that said Letters Patent is hereby corrected as shown below:

Column 1,
Line 40, change "10/120,897 filed Apr. 10, 2002, titled" to -- 10/120,897, titled --.

Column 10,
Line 32, change "bc_entities.can_own_that" to -- bc_entities.can_own_p that --.

Signed and Sealed this

Fourteenth Day of March, 2006

JON W. DUDAS
*Director of the United States Patent and Trademark Office*